US012608235B1

(12) United States Patent
Spoonauer et al.

(10) Patent No.: US 12,608,235 B1
(45) Date of Patent: Apr. 21, 2026

(54) MAXIMIZING AND UN-MAXIMIZING TRAFFIC-DRIVEN COMPUTE RESOURCES FOR DEPLOYMENTS IN A REGION

(71) Applicant: priceline.com LLC, Norwalk, CT (US)

(72) Inventors: Michael Vincent Spoonauer, Mamaroneck, NY (US); Gavin Lam, Darien, CT (US)

(73) Assignee: priceline.com LLC, Norwalk, CT (US)

( * ) Notice: Subject to any disclaimer, the term of this patent is extended or adjusted under 35 U.S.C. 154(b) by 410 days.

(21) Appl. No.: 18/343,600

(22) Filed: Jun. 28, 2023

(51) Int. Cl.
*G06F 9/46* (2006.01)
*G06F 9/50* (2006.01)

(52) U.S. Cl.
CPC ................................. *G06F 9/5038* (2013.01)

(58) Field of Classification Search
None
See application file for complete search history.

(56) References Cited

U.S. PATENT DOCUMENTS

2011/0179162 A1* 7/2011 Mayo ...................... H04L 67/02
718/1
2023/0143129 A1* 5/2023 Bettenbuk ............... H04L 47/28
370/235

OTHER PUBLICATIONS

Sansottera et al; Consolidation of Multi-Tier Workloads with Performance and Reliability Constraints; IEEE 2012 (Year: 2012).*

* cited by examiner

*Primary Examiner* — Bing Zhao
(74) *Attorney, Agent, or Firm* — McDermott Will & Schulte LLP

(57) ABSTRACT

A method and system for maximizing and un-maximizing computing resources. The method includes identifying a first and second region in a compute environment, each region comprising a first and second set of compute resources, respectively. The method also includes identifying, based on runtime metadata, a minimum value of the second set of compute resources and a maximum value of the second set of compute resources in the second region. The method also includes storing the minimum value as temporary runtime metadata in the second set of compute resources. The method also includes maximizing the second set of compute resources by updating the minimum value to the maximum value. The method also includes un-maximizing, after waiting a predetermined time period, by setting the minimum value to its original minimum value based on the temporary runtime metadata and clearing the temporary runtime metadata from the second set of compute resources.

20 Claims, 6 Drawing Sheets

Figure 4:
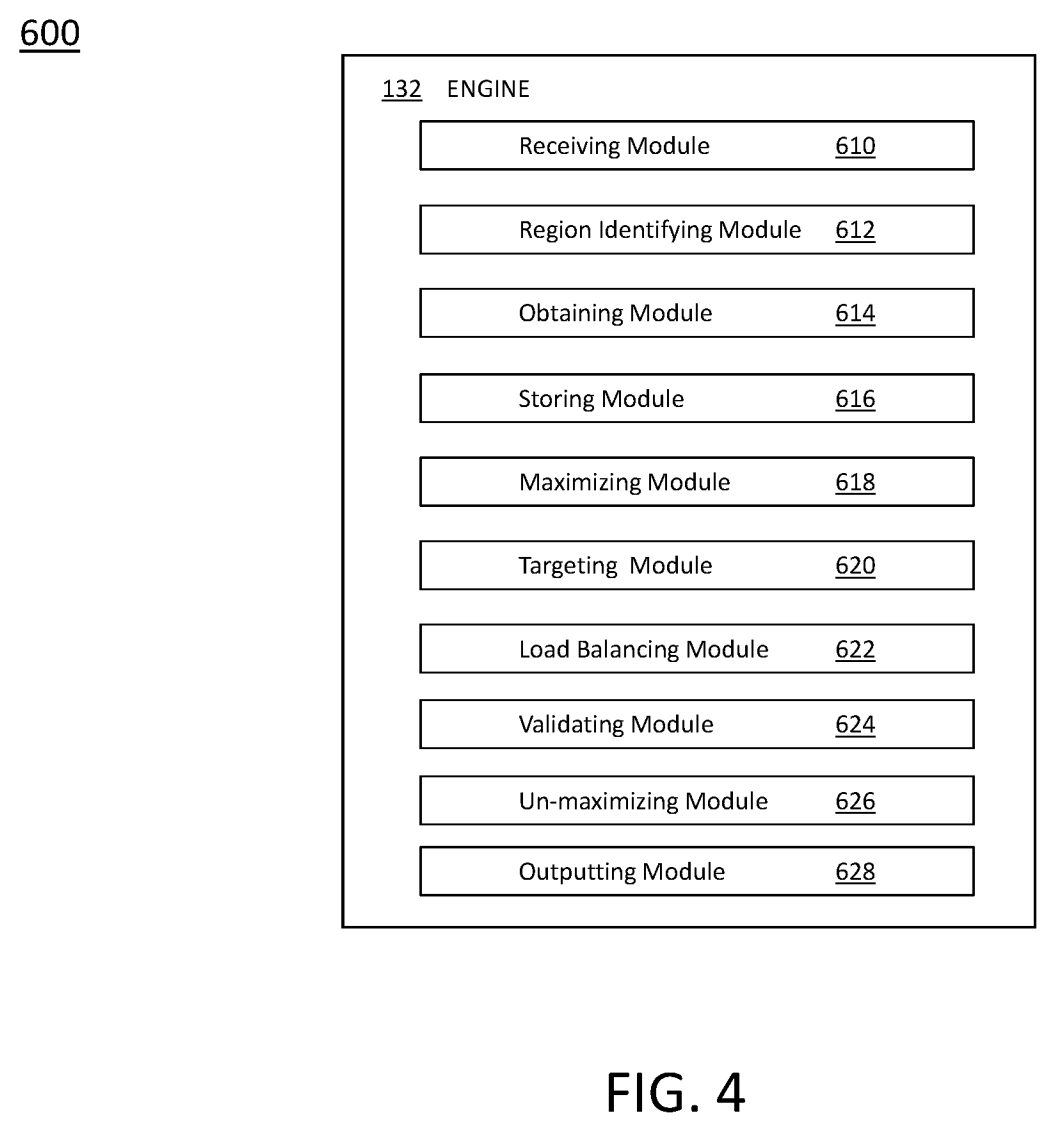

132   ENGINE

Receiving Module    610

Region Identifying Module    612

Obtaining Module    614

Storing Module    616

Maximizing Module    618

Targeting Module    620

Load Balancing Module    622

Validating Module    624

Un-maximizing Module    626

Outputting Module    628

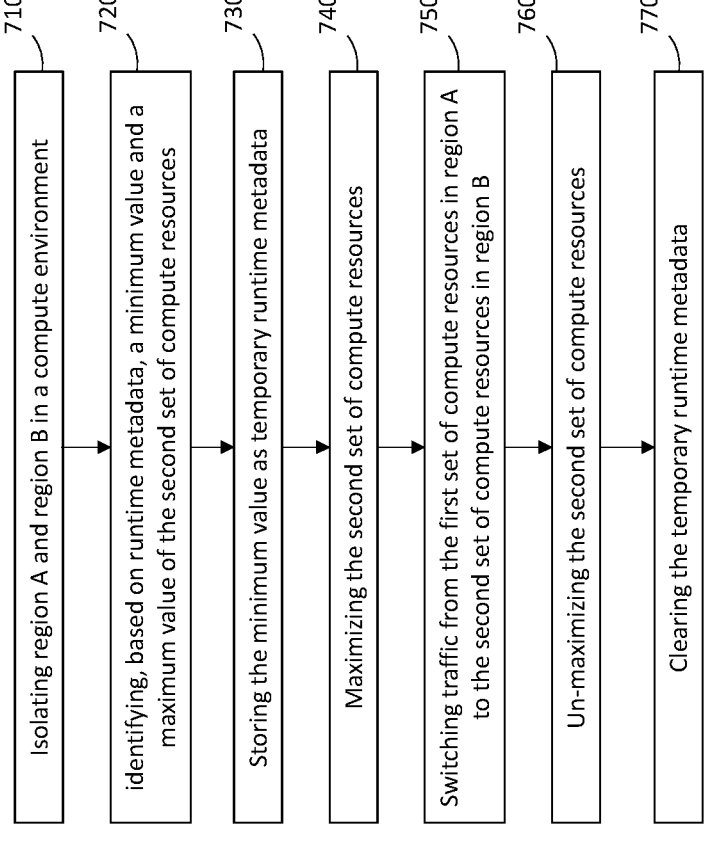

710 Isolating region A and region B in a compute environment 720 identifying, based on runtime metadata, a minimum value and a maximum value of the second set of compute resources 730 Storing the minimum value as temporary runtime metadata 740 Maximizing the second set of compute resources 750 Switching traffic from the first set of compute resources in region A to the second set of compute resources in region B 760 Un-maximizing the second set of compute resources 770 Clearing the temporary runtime metadata

FIG. 5

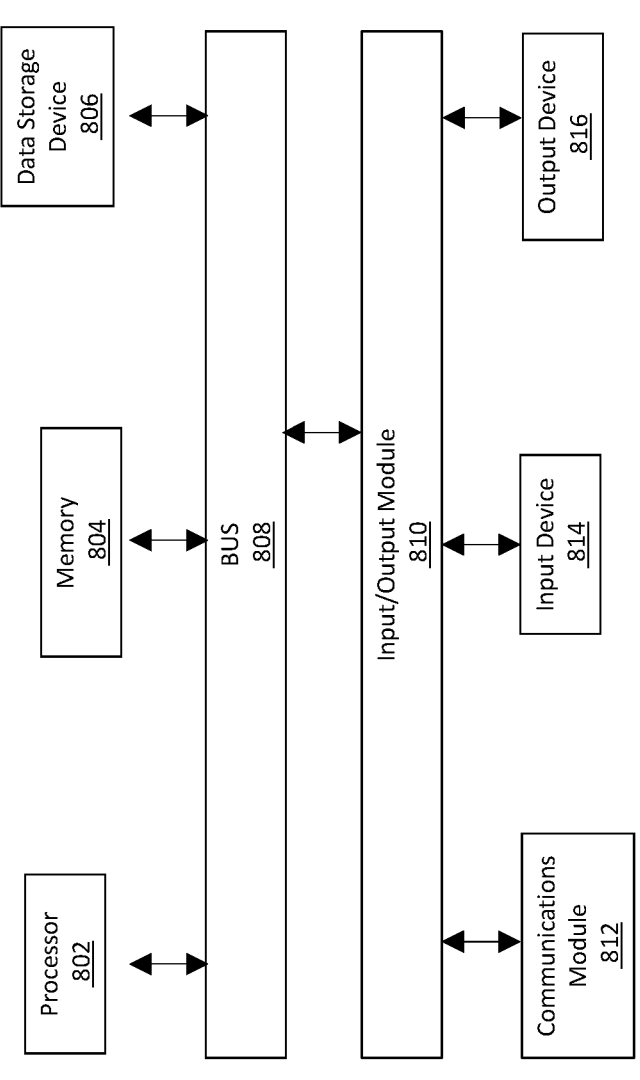
FIG. 6

MAXIMIZING AND UN-MAXIMIZING TRAFFIC-DRIVEN COMPUTE RESOURCES FOR DEPLOYMENTS IN A REGION

BACKGROUND

Field

The present disclosure is generally related to maximizing/un-maximizing workload in compute resources within a region to improve platform stability and performance. More specifically, the present disclosure includes automatically and seamlessly integrating maximizing/un-maximizing components into regional failover and failback processes.

Related Art

Regional failovers are typically performed periodically in large compute environments The regional failovers may be performed, for example, for maintenance reasons or simply to validate that a region is operable. When a failover occurs and customer traffic switches to a single region, workloads like database clusters or Kubernetes deployments that rely on horizontal autoscaling cannot scale fast enough based on demand-driven metrics alone, causing stability issues to the target region. To avoid this issue, users may set higher minimums for these resources in some cases. However, this increases cost in the long run.

SUMMARY

The subject disclosure provides for systems and methods for performing failover stabilization. In one aspect of the present disclosure, the method includes: isolating a first region and a second region in a compute environment, the first region comprising a first set of compute resources and the second region comprising a second set of compute resources; identifying, based on runtime metadata, a minimum value of the second set of compute resources and a maximum value of the second set of compute resources in the second region; storing the minimum value as temporary runtime metadata in the second set of compute resources; maximizing the second set of compute resources by updating the minimum value to the maximum value; switching traffic from the first set of compute resources in the first region to the second set of compute resources in the second region; un-maximizing, after waiting a first time period, the second set of compute resources by setting the minimum value to its original value based on the temporary runtime metadata; and clearing the temporary runtime metadata from the second set of compute resources.

Another aspect of the present disclosure relates to a system configured for failover stabilization. The system includes one or more processors, and a memory storing instructions which, when executed by the one or more processors, cause the system to perform operations. The operations include: isolating a first region and a second region in a compute environment, the first region comprising a first set of compute resources and the second region comprising a second set of compute resources; identifying, based on runtime metadata, a minimum value of the second set of compute resources and a maximum value of the second set of compute resources in the second region; storing the minimum value as temporary runtime metadata in the second set of compute resources; maximizing the second set of compute resources by updating the minimum value to the maximum value; switching traffic from the first set of compute resources in the first region to the second set of compute resources in the second region; un-maximizing, after waiting a first time period, the second set of compute resources by setting the minimum value to its original value based on the temporary runtime metadata; and clearing the temporary runtime metadata from the second set of compute resources.

Yet another aspect of the present disclosure relates to a non-transient computer-readable storage medium having instructions embodied thereon, the instructions being executable by one or more processors to perform a method (s) described herein. The method may include identifying one or more compute resources in a target region, and identify whether a maximize or un-maximize action is specified for the one or more compute resources in the target region. Based on the maximize action being specified, switching traffic from a region to the target region. The switching is configured to: obtain a minimum value and a maximum value from autoscaling configurations; save the minimum value as a label in the one or more compute resources; and set the minimum value to match the maximum value. Based on the un-maximize action being specified, performing un-maximizing of the one or more compute resources. The un-maximizing is configured to: retrieve the minimum value from the label stored in the one or more compute resources; set the minimum value to an original minimum based on the retrieved label; and clear the label.

These and other embodiments will be evident from the present disclosure.

BRIEF DESCRIPTION OF THE DRAWINGS

FIG. 4 illustrates an example block diagram of a system for performing failover using compute resources in a compute environment, according to some embodiments.

FIG. 5 illustrates a flowchart of a method for performing failover using compute resources in a compute environment, according to some embodiments.

FIG. 6 is a block diagram illustrating a computer system used to at least partially carry out one or more of operations in methods disclosed herein, according to some embodiments.

In the figures, elements having the same or similar reference numerals are associated with the same or similar attributes, unless explicitly stated otherwise.

DETAILED DESCRIPTION

Figure 1:
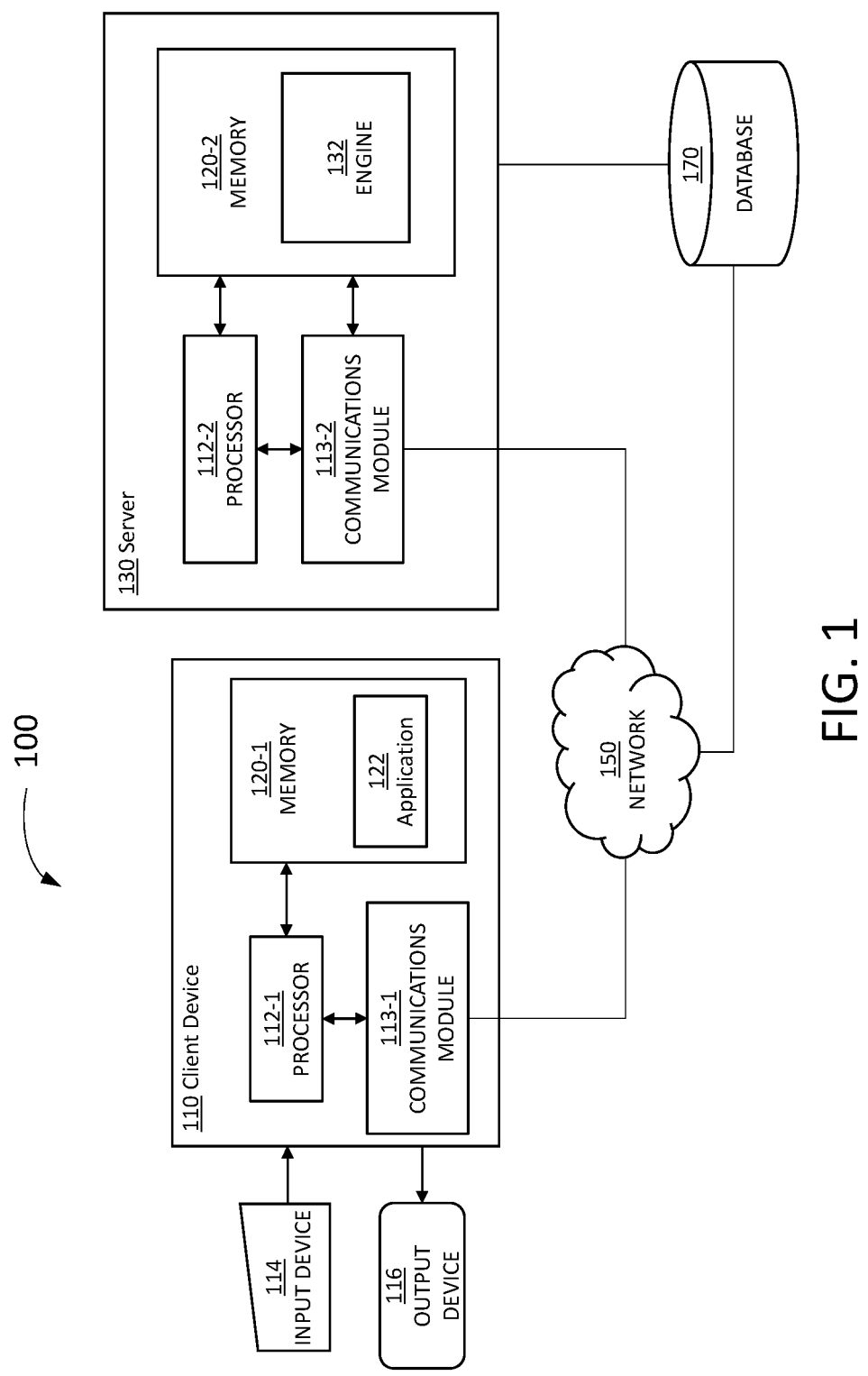
FIG. 1 illustrates a network architecture used to implement maximize/un-maximize load in a failover, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In on-premises or cloud compute platforms, there is a need for compute environments that have the ability to automatically scale compute resources based on performance metrics. Compute environments may include databases (such as Google BigTable) and/or container orchestrator (such as Google Kubernetes Engine (GKE) deployments). The compute environment contains various compute resources. A compute resource may be any type of resource (e.g., BigTable clusters and Kubernetes Horizontal Pod Auto-scaler (HPA) objects) that is configurable to increase/decrease capacity, and thus used to orchestrate autoscaling. A compute environment may be multi-regional. A region contains one or more clusters. Users may create instances of a compute environment using the compute resources for storing data. Instances may have one or more clusters located in different regions. Clusters have one or more nodes that manage data in the compute environment and perform maintenance tasks. Nodes may be assigned a specific locality representing a region or zone. The locality corresponds to, for example, a provider region or zone in which the node is deployed.

Regional failovers (or multi-regional failovers) are typically performed periodically in compute environments to provide capacity and business continuity. The regional failovers may be performed, for example, for maintenance reasons or simply to validate that a region is operable. Compute resources are used to perform the regional failover which switches traffic from one region to another. When compute resources are not able to scale fast enough, they are unable to handle the influx of traffic. As a result, the computing platforms may experience slowness on the platform or temporary error messages while attempting to perform actions/requests on the platform. Other failover challenges include latency and intermittent failures in the customer experience, hesitancy to perform regional failovers unless necessary, overhead in manually scaling up and then back down resources to compensate, and increased costs from purposefully setting resource minimums to higher levels than typically needed to avoid customer issues.

Further, when switching traffic, under-provisioned applications may experience errors, making them vulnerable to crashing, which could threaten the overall operation of the region. In extreme circumstances, the region will not be able to recover without significant attention/intervention, creating an overall stability risk in the system. To mitigate the risk of errors on failover, users may set minimums (e.g., CPU usage, number of pods for a deployment, or the like) of a compute resource conservatively high. However, this approach prevents the system from achieving most of the cost saving benefits of horizontal autoscaling (such as with the example of Kubernetes HPA object). As such, there is a need for methods and systems that assure stability and performance while performing regional failovers and scheduling regional failovers with confidence and without worrying about disruptions to customers.

Embodiments, as disclosed herein, provide a solution to the above-mentioned problems rooted in computer technology, namely, optimizing compute environments by streamlining regional failovers through the use of maximizer/un-maximizer components. The components are configured to manipulate compute resources to speed up the process of failover from one region to another and increase the capacity of compute resources to handle incoming traffic. Embodiments may be applied to deployments configured for autoscaling (e.g., driven by horizontal pod autoscaling) which allow for, in response to increased load capacity. A deployment includes a set of compute resources (e.g., pods) that are used to provide the functionality for an application or service. When auto-scaling, a scaling engine may create an unintended result or custom metrics may be interrupted. Maximizer/un-maximizer components and workflows, according to embodiments, allow the scaling engine to mitigate issues immediately and reliably, allowing users to further investigate after the fact. Embodiments achieve these advantages by updating compute resource definitions by manipulating runtime metadata. The maximizer/un-maximizer components manipulate compute resources to adjust, for example, replicas needed for a deployment and/or nodes needed for a cluster.

The disclosed subject technology further provides improvements to the functioning of the computer itself using the set of components and workflows that automatically maximize and un-maximize traffic-driven compute resources in regions prior to receiving all traffic in a compute environment. This provides a resource aware solution to issues presented by failovers (and failbacks) in a region. The set of components can scale resources up with no prior knowledge or configuration and are idempotent. This virtually eliminates any maintenance burden or risk of misconfiguration affecting production in a region. Further, the scaled-up clusters and deployments are immediately scaled down after a brief pause following the switching over of all traffic to ensure that the platform is not incurring expenses for capacity that is not needed. The workflows, according to embodiments, are dynamic, responsive, configurable, API-driven, and may be seamlessly integrated into the regional failover process. Additionally, embodiments also allow users to get real-time feedback on issues in the maximization of compute resources.

Example Architecture

FIG. 1 illustrates a network architecture 100 used to maximize/un-maximize load in a failover, according to some embodiments. Architecture 100 may include servers 130 and a database 170, communicatively coupled with one or more client device(s) 110 via a network 150. Any one of servers 130 may host an application on client device 110, used by one or more of the participants in the network. Client device 110 may include any one of a laptop computer, a desktop computer, or a mobile device such as a smartphone, a palm device, video player, or a tablet device.

Client device 110 may be coupled with an input device 114 and with an output device 116. A user may interact with client device 110 via the input device 114 and the output device 116. Input device 114 may include a mouse, a keyboard, a pointer, a touchscreen, a microphone, a joystick, a virtual joystick, a touchscreen display that a user may use to interact with client device 110, or the like. In some embodiments, input device 114 may include cameras, microphones, and sensors, such as touch sensors, acoustic sensors, inertial motion units—IMUs—and other sensors configured to provide input data to a VR/AR headset. Output device 116 may be a screen display, a touchscreen, a speaker, and the like.

Client device 110 may also include a processor 112-1, configured to execute instructions stored in a memory 120-1, and to cause client device 110 to perform at least some operations in methods consistent with the present disclosure. Memory 120-1 may further include an application 122, configured to run in client device 110 and coupled with input device 114 and output device 116. The application 122 may be downloaded by the user from server 130 and may be hosted by server 130. The server 130 may be associated with a platform/organization accessed by the application 122 at the client device 110. The application 122 includes specific instructions which, when executed by processor 112-1, may cause one or more operations to be performed according to methods described herein. In some embodiments, the application 122 is associated with a compute environment and runs on, for example, an operating system (OS) installed in client device 110, a web browser, or the like.

Client device 110 and server 130 are communicatively coupled over network 150 via respective communications modules 113-1 and 113-2 (hereinafter, collectively referred to as "communications modules 113"). Communications modules 113 are configured to interface with network 150 to send and receive information, such as requests, uploads, pass data, and commands to other devices on the network 150. Communications modules 113 can be, for example, modems or Ethernet cards, and may include radio hardware and software for wireless communications (e.g., via electromagnetic radiation, such as radiofrequency—RF—, near field communications—NFC—, Wi-Fi, and Bluetooth radio technology). Communication modules 113 can communicate via an application-programming interface (API). As such, client device 110 can communicate with database 170 (or database system) using the API via the network 150.

Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

The database 170 may be configured to store and manage data associated with the application 122. In one or more embodiments, the database 170 can comprise a NoSQL or other non-relational database. The database 170 can store and manage data.

Server 130 includes a memory 120-2, a processor 112-2, and communications module 118-2. Hereinafter, processors 112-1 and 112-2, and memories 120-1 and 120-2, will be collectively referred to, respectively, as "processors 112" and "memories 120." Processors 112 are configured to execute instructions stored in memories 120. In some embodiments, memory 120-2 includes an engine 132. The user may access engine 132 through application 122, installed in a memory 120-1 of client device 110. Accordingly, application 122 may be installed by server 130 and perform scripts, workflows, and other routines provided by server 130. Execution of application 122 may be controlled by processor 112-2.

Engine 132 may include one or more modules (e.g., modules later described with reference to system 600 in FIG. 4) configured to perform operations according to one or more aspects of embodiments described herein. The engine 132 may include a maximizer component and an un-maximizer component. Accordingly, in some embodiments, engine 132 is configured to access the database 170 to retrieve documents, commands, instructions, etc. In some embodiments, engine 132, the tools contained therein, and at least part of the database 170 may be hosted in a different server that is accessible by server 130 or client device 110. The engine 132 may comprise cloud computing services computing operations (e.g., data processing, data storage, and the like).

Figure 2:
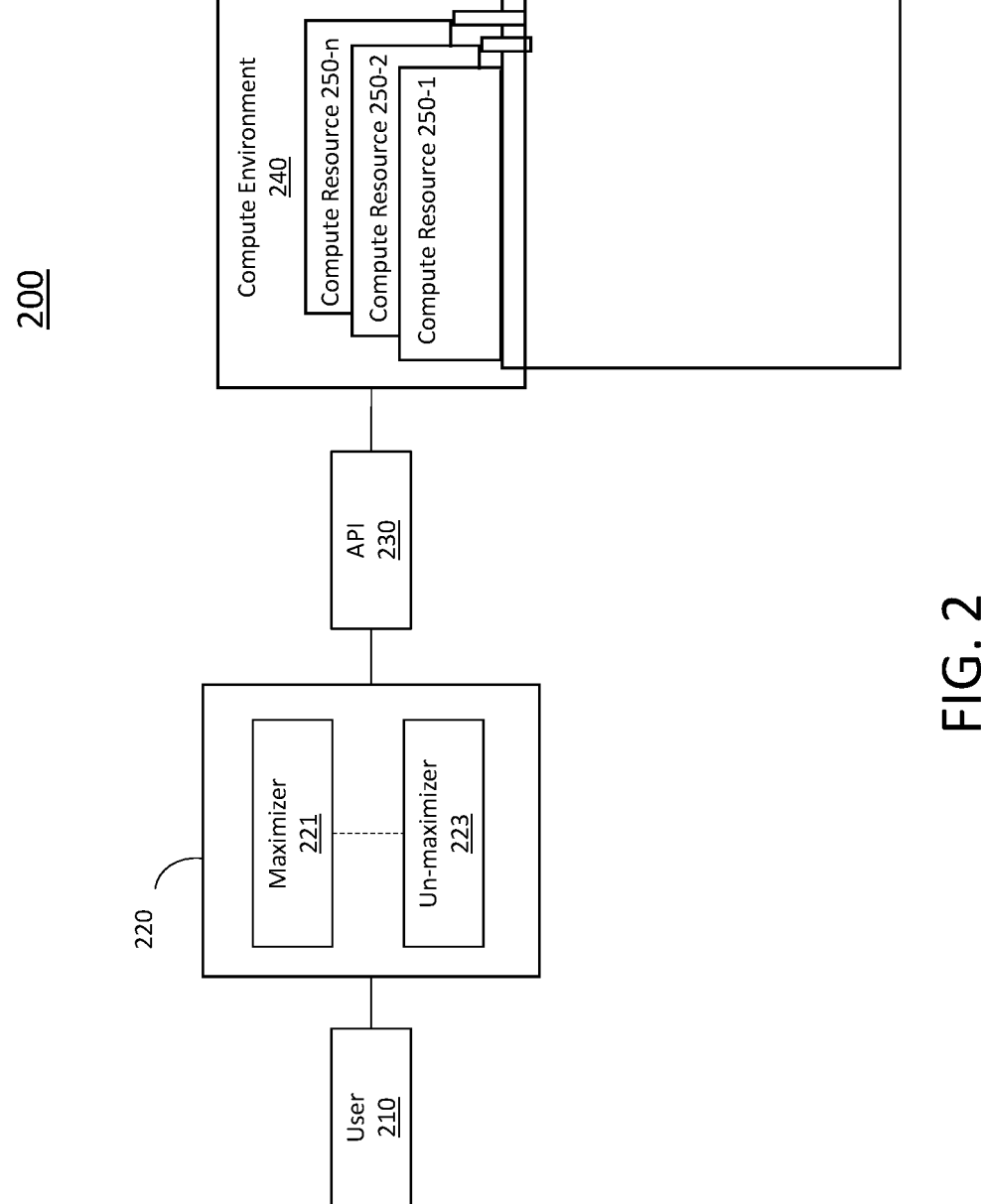
FIG. 2 illustrates an example block diagram of systems for managing load in regional failovers.

FIG. 2 illustrates an example block diagram of a system 200 for managing load in regional failovers, according to one or more embodiments. The system 200 may include a load balancer 220 comprising a maximizer 221 and un-maximizer 223. Embodiments leverage the load balancer 220 to shift traffic from a first to a target region. The load balancer 220 is leveraged to shift traffic from a first region to a second region. The load balancer 220 is configured to direct traffic that are underneath compute resources in a target region to take traffic from another region.

The system 200 may identify the target region, comprising one or more compute resources. A user 210 may specify a maximize or un-maximize action for the compute resources in the target region. The user may be an administrative user of an organization or platform managing a service or an application (e.g., performing a production release or deployment, creating and managing resources when deploying, etc.). The system may identify whether a maximize or un-maximize action is specified for the one or more compute resources in the target region. When the maximize action is specified, the maximizer 221 may use an API 230 to retrieve autoscaling configurations for one or more compute resources 250-1, 250-2 . . . , 250-$n$ (collectively referred to as "compute resource 250") in the target region of a compute environment 240. The autoscaling configurations are specifications of the compute resources that detail configuration metadata/parameters. The compute resource 250 may define rules and load balancing for accessing the service or application from, e.g., the web or other applications. That is, the compute environment 240 may include scaling parameters defined in autoscaling configurations. The compute environment 240 may be on-primus or cloud based and the API 230 may include additional information (e.g., metadata describing attributes of the user, the database, etc.). For example, the compute environment 240 may be a wide-column and key-value NoSQL database service for large analytical and operational workloads as part of a cloud portfolio (such as Google BigTable).

For each compute resource 250, a minimum and a maximum are obtained from the autoscaling configuration. The minimum and/or maximum may be stored in the compute resource 250. The minimum may be saved as a label in the compute resources. In some implementations, the compute resources include a label and a value of the minimum is saved in the label. The label may comprise an arbitrary key/value pair that is attached to the compute resources. The maximizer 221 may be configured to scale up to a minimum resource capacity allocated for a compute resource based on metadata according to the autoscaling configurations of the region in the compute environment 240. The minimum is set to a value equal to the obtained maximum node count, allowing traffic to be redirected to the compute environment now having a greater minimum allowable capacity.

When the un-maximize action is specified, the un-maximizer 223 may use the API 230 to retrieve autoscaling configurations for one or more compute resources 250 in the target region. After maximization, the un-maximizer 223 may be configured to retrieve the minimum stored in the compute resources (e.g., from the label) and scale down to the resource capacity allocated for the compute resource to the minimum. That is, the minimum is set to a value equal to the original minimum obtained from the autoscaling configuration. The un-maximizer 223 may be further configured to clear the stored value(s). In some implementations, the stored value(s) is cleared before the next region failover instance.

According to embodiments, the maximizer 221 and un-maximizer 223 allow the system to efficiently use compute resources to reduce cost and allow the infrastructure (e.g., compute environment) to follow customer traffic more closely. The ability to set a maximum capacity of a compute resource above what is expected protects customers (of, e.g., a platform depending on the compute environment) from resource exhaustion. In this manner, users (e.g., user 210) may be advantageously alerted of an excess use of compute resources (over the expected value), rather than being alerted about a service impact on the platform due to insufficient resources.

According to some embodiments, the maximizer 221 and/or the un-maximizer 223 may be configured to support the specification of a plurality of attributes that introduce specificity in terms of what compute resources should be maximized or un-maximized. By non-limiting example, the plurality of attributes may include, but are not limited to, a namespace to be targeted within a compute environment and/or region, an individual HPA object to be targeted within a cluster and namespace, a text file (e.g., JSON file) containing names of clusters, namespaces and HPA objects to be targeted, etc.

Figure 3:
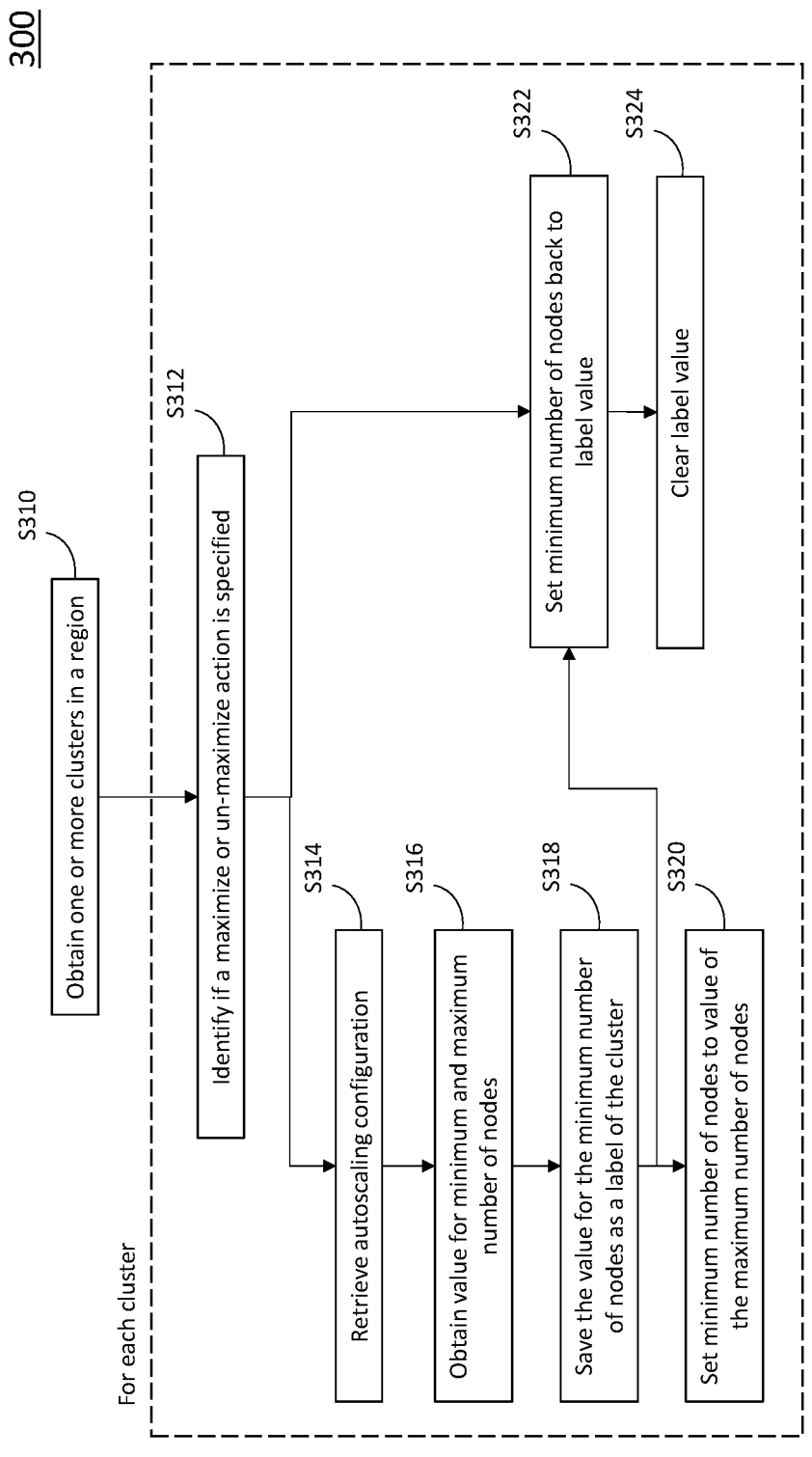
FIG. 3 illustrates a workflow of a process for managing load in regional failovers, according to one or more embodiments.

FIG. 3 illustrates a workflow of a process 300 for managing capacity of compute resources during regional failover, according to some embodiments. The compute resource may include any type of resource that can scale. In some implementations, one or more of the steps in process 300 may be performed by one or more of the blocks in system 200. In some embodiments, methods consistent with the present disclosure may include at least one or more steps as in process 300 performed in a different order, simultaneously, quasi-simultaneously or overlapping in time.

A multi-regional failover process is performed to provide capacity and business continuity. Thus, traffic may be switched from a first region to a target region based on runtime metadata specified by configuration parameters of the target region. That is, the first region is the region failing over traffic and may include one or more regions. The target region is the region traffic is failing over to. The target region may replicate all configurations and data of the first region. As part of the regional failover process, prior to enabling traffic to switch from the first region to the target region, the capacity of the compute resources in the target region are increased by leveraging a preset maximum of the target region. The preset maximum (hereafter simply referred to as "maximum value") is a static value defined by configuration parameters for each region. The maximum value is equivalent to a possible maximum traffic capacity that the target region is capable of handling. Although the region may not be operating at the maximum value, the maximum capacity may be leveraged for failover to enable the target region to handle traffic from another region. The failover process is further detailed in the steps of FIG. 3.

At S310, the process 300 includes obtaining one or more compute resources, in a target region (or project) in a compute environment, which may be maximized/un-maximized. Steps S312-S324 of process 300 may be performed for each compute resource identified in the target region. Compute resources may be traffic-driven components including, but not limited to, for example, Bigtable clusters in a Google Bigtable instance (i.e., the computing environment).

According to some embodiments, Kubernetes clusters are the computing environments containing compute resources such as HPA objects for Kubernetes deployments, wherein the HPA objects are to be maximized/un-maximized. As such, the process 300 may include obtaining clusters included in a region, obtaining all objects across all namespaces for each of the clusters, and performing steps S312-S324 of process 300 for each object.

At S312, the process 300 includes identifying whether a maximize or un-maximize action is specified. The specified maximize or un-maximize action allows the compute environment to manipulate runtime metadata of the compute resources in the target to automatically start taking advantage of resources without any reconfiguration.

If a maximize action is specified, the process 300 proceeds to S314 wherein the target region will be maximized to handle traffic from the first region. At S314, an autoscaling configuration corresponding to a compute resource is retrieved. At S316, a minimum value representing a minimum capacity (e.g., number of nodes of a cluster) of the compute resource and a maximum value representing a maximum capacity of the compute resource are obtained from the autoscaling configuration. The compute resource may be accepting traffic at any value between the minimum and maximum value.

At S318, the obtained minimum value is stored as a label in the compute resource. The label defines new runtime metadata which represents a new maximum value for the target region. The label may be stored temporarily and automatically cleared when the failover is complete. The label may comprise an arbitrary key/value pair that is attached to the compute resource. In some implementations, the minimum number is saved as an annotation or comment associated with the compute resource.

At S320, the minimum value is updated to a temporary minimum. The temporary minimum is set to the maximum value. For example, if a maximum capacity of a compute resource is set to 30 and a minimum capacity of the compute resource is set to 10, then the minimum value of 10 is updated to 30. As such, embodiments may include automatically determining a difference in available workload units of the compute resources and the updated minimum value (which is set to the maximum) in the compute environment, and creating workload units based on the difference using an API. Following the same example, if the compute resource is currently handling 20 workload units (e.g., cluster nodes/deployment replicas), then 10 workload units may be created, moved or replicated (i.e., enough to meet the updated minimum value) to allow traffic from up to 30 workload units in the compute resource.

In some implementations, the temporary minimum may be calculated based on traffic at runtime in the first region when implementing the failover process. For example, the temporary minimum may be calculate based on a current traffic load of the first region and the target region. A minimum of the target region is set to the calculated minimum maximum. As such, the system allocates compute resources on a calculated basis allowing enough workload units to handle the combined traffic from the first and second regions. By non-limiting example, a first region has a current load of 10, and a second region to which the traffic is failing over to (i.e., the target region) has a current load of 15. Then, the calculated temporary minimum may be 25. Thus, the minimum value of the second region is set to 25. In this manner, the minimum capacity of the second region is maximized to the value required by the first region in addition to the second region. The second region is maximized to handle a total load to perform the failover.

According to some embodiments, the process may further include analyzing a state of the compute resource. The state may be queried using a polling mechanism to determine exactly when all the compute resources have been successfully maximized. For example, the compute resource may be polled every N seconds until the compute resource's traffic received matches the temporary minimum. The value of N may be configurable by the compute environment or the user. In some implementations, for example, a compute resource is polled every N seconds until every resource in a deployment associated with the specified compute resource is updated, available, and ready (e.g., using a rollout status deployment). In some implementations, a value of available compute resources does not match the temporary minimum for a given deployment, the deployment may not be considered to be fully available and there may be infrastructural provisioning issues (e.g., with virtual node groups, etc.) that are preventing deployments from becoming fully ready at their maximums. Embodiments may include enhancing the system to consider these infrastructural limitations. In some implementations, the system includes triggering an alert transmitted to the user in response to an infrastructural issue being detected.

If an un-maximize action is specified (at S312), the process 300 proceeds to S322 wherein the target region will be un-maximized to handle traffic in accordance with its initially defined runtime configuration. The un-maximize action may be specified based on a determination that traffic has successfully switched from the first region to the target region. At S322, using the label stored in the compute resource (at S318), the minimum value is set back to its original minimum value (obtained at S316) retrieved from the label.

At S324, the label is cleared. That is, the value temporarily stored in the label at S318 is cleared).

In some implementations, the compute resources are configured to wait a predetermined amount of time. After the predetermined amount of time has lapsed, automatically initiating un-maximization (S322). The predetermined amount of time may be a time long enough for the system to stabilize and safely scale down to an original minimum value. In some implementations, the process includes determining if the temporary minimum is met (i.e., the traffic has failed over to the target region). After the temporary minimum is met, the engine (e.g., engine 132) waits the predetermined amount of time and sets the minimum value back to its original minimum value (retrieved from the label). As such, embodiments temporarily require the switching of customer traffic from one region to another, including a brief pause following the switching over of all traffic to ensure that the user does not incur expenses for load capacity that is not needed.

The process 300 may further include determining if any of the steps in the process 300 fail. For example, a particular load balancer in region A may be set to receive a load of 10 and region B may be set to receive a load of 30. If the designated load assignments fail, the process stops (e.g., traffic is not successfully routed to/from region A/B, etc.).

FIG. 4 illustrates an example block diagram of a system 600 for performing failover using compute resources in a compute environment, according to one or more embodiments. The system 600 may include computing platform(s) that may be configured by machine-readable instructions. Machine-readable instructions may include one or more instruction modules. The instruction modules may include computer program modules. The instruction modules may include one or more of receiving module 610, region identifying module 612, obtaining module 614, storing module 616, maximizing module 618, targeting module 620, load balancing module 622, validating module 624, un-maximizing module 626, outputting module 628 and/or other instruction modules.

In some implementations, one or more of the modules 610, 612, 614, 616, 618, 620, 622, 624, 626, and 628 may be included in the server 130 (e.g., in the engine 132) and be performed by one or more processors (e.g., processor 112-2). In some implementations, one or more of the modules 610, 612, 614, 616, 618, 620, 622, 624, 626, and 628 are included in and performed by a combination of the client device and the server. Although FIG. 4 shows example blocks of the system 600, in some implementations, the system 600 may include additional blocks, fewer blocks, different blocks, or differently arranged blocks than those depicted in FIG. 4. Additionally, or alternatively, two or more of the blocks of the system may be combined.

The receiving module 610 is configured to receive a regional failover operation request from an operator of a platform or the like. The regional failover operation request initiates a failover process. The failover process includes switching traffic from, for example, a region A to a region B. Embodiments are not limited to this. For example, the failover process may be multi-regional, thus may comprise switching traffic from region A to a plurality of regions (e.g., region B and region C) based on runtime metadata (e.g., in autoscaling configurations) of the regions. The failover operation may be performed in compute resources (e.g., clusters containing a set of nodes and/or objects containing a set of replicas).

The region identifying module 612 is configured to isolate a first region and a second region based on capacity of the regions in a compute environment, the regions each comprising a set of compute resources. The second region acts as the target region to which traffic will failover to from the first region. The region identifying module 612 determines which regions, from a plurality of regions in which compute resources operate, are best suited for the failover, and further selecting the best suited regions for the failover operation. In some implementations, the user may specify the target region for the failover operation. In some implementations, the user may specify the compute resources within the target region that will be targeted for the failover operation.

The obtaining module 614 is configured to obtain a minimum value and a maximum value of the compute resources in the target region. The minimum value and the maximum value may be retrieved from autoscaling configurations corresponding to each compute resource in the set compute resources. Autoscaling configurations details, at least, runtime metadata for each of compute resources in a region. The minimum value and the maximum value represent a runtime capacity of the compute resource.

The storing module 616 is configured to store the minimum value as temporary runtime metadata for the computer resources in the target region. The temporary runtime metadata may be a label, annotation, or comment stored in the computer resources within the target region. That is, the temporary runtime metadata is stored on a per-computer resource basis.

The maximizing module 618 is configured to maximize the minimum value of the compute resources in the target region to the maximum value (hereafter "updated minimum value"). Specifically, the minimum value corresponding to the compute resources is set to the maximum value. By increasing the minimum value of compute resources in the target region, traffic from the first region may be directed to the target region.

The targeting module 620 is configured to target a set of compute resources within the target region. The targeting module 620 may be configured to target a set of compute resources in the first region. In some implementations, the system receives a selection of specified compute resources to be targeted from, e.g., the operator. This helps limit the scope of what will be included in the maximizing/un-maximizing. For example, if an application in the first region is being tested for specified compute resources (e.g., clusters or namespaces) within the first region, compute resources outside of those specified will not be tested. This will reduce unnecessary costs of the system. In some implementations, all compute resources within a selected region are targeted.

The load balancing module 622 is configured to set all compute resources (e.g., load balancer backends) in the first region to zero percent. In some embodiments, the load balancing module 622 sets the target set of compute resources in the first region to zero percent. The load balancing module 622 may further be configured to switch traffic from the compute resources in the first region to the compute resource in the target region. In some implementations, for all services available on the platform, the load balancing module 622 may find the corresponding backend service and set its capacity scaler to zero using compute APIs. As such, traffic in the first region is set to zero and switched to the target region. The system 600 is configured to wait a given amount of time for all traffic to switch from the first region (i.e., first region reduces to 0% capacity) to the target region (i.e., reaches a maximum capacity based on the updated minimum value).

The validating module 624 is configured to poll the compute resources in the target region to validate the maximization has successfully completed (i.e., verify whether a number of compute resources has reached the required value based on the updated minimum value). The polling may validate the maximization by determining if the number of workload units of the compute resources match the updated minimum value. The system 600 is configured to wait a given amount of time for the compute resources in the target region to fully maximize (i.e., meet the updated minimum value) before validating.

The un-maximizing module 626 is configured to un-maximize the compute resources in the target region by setting the updated minimum value back to the minimum value based on the temporary runtime metadata stored in the compute resources. The compute resources may be un-maximized after waiting a predetermined amount of time to ensure a stable transition. As such, performing an automatic failback operation to revert traffic capacity of compute resources in accordance with the original autoscaling configurations of the regions without incurring expenses for increased capacity, which was only needed for completing the failover process.

In some embodiments, the system includes retrieving the minimum value (i.e., the original minimum) from the label (or annotation) stored in association with the compute resources to perform the un-maximizing. The label is then cleared after the target region is unmaximized. According to embodiments, the maximizing and un-maximizing may occur gradually based on the application. For example, the percentage traffic for a first region may gradually be decreased while the percentage of another is gradually increased.

In some embodiments, the system includes determining whether a maximization or un-maximization failure (e.g., engine is unable to allocate workload units according to the set maximize/un-maximize values) has occurred by checking a status of the maximization/un-maximization. In the event of a maximization or un-maximization failure, the system may be configured to transmit an alert to the user via a platform server, or the like. In the event of a maximization failure, the system may immediately stop the failover process before proceeding to un-maximizing.

In some embodiments, the platform may include a reporting interface for the user to track the status of the maximization/un-maximization, details on any related failures in a failover process or any aspects of the regional failover process that have failed, and/or monitoring of the failover process without interrupting the failover process. Embodiments may include generating alerts detailing, for example, which deployments were not able to be fully maximized within a preset time and displaying the alerts at a user interface (the same or different from the reporting interface) of the service or application.

In some embodiments, the system includes analyzing the failover, report data, failover status data, etc. The outputting module 628 is configured to output results of the failover. By non-limiting example, if a given deployment did not fully maximize in a preset time period, the system may determine that a time increase of amount X would have allowed for the missing workload units to be created and fully maximize the compute resources. In some embodiments, the outputting module 628 is further configured to provide recommendations/predictions for the user based on the analysis. In some embodiments, the outputting module 628 is even further configured to provide an alert to the user.

FIG. 5 illustrates a flowchart of a method 700 for performing failover using compute resources in a compute environment, according to some embodiments. The example flowchart of FIG. 5 is directed to clusters in a database. Embodiments are not intended to be limited to this and may be applied to, for example, deployments of an engine, or the like.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 5 may be performed by a processor circuit executing instructions stored in a memory circuit, in a client device, a remote server or a database, communicatively coupled through a network (e.g., processors 112, memories 120, client device 110, server 130, and network 150). In some implementations, one or more of the operations in method 700 may be performed by one or more of the modules 610, 612, 614, 616, 618, 620, 622, 624, 626, and 628. Operations of method 700 may be triggered by a failover process. The failover process may be initiated at a platform server (e.g., server 130) by an operator (e.g., user 410). For example, an operator of a platform may make a failover operation request which initiates the failover process. The failover includes switching a load capacity from region A to region B. In some embodiments, region B may include one or more regions in which a database processing an application of the platform operates.

In operation 710, the method 700 isolates region A and region B in a compute environment. Region A comprises a first set of compute resources and region B comprises a second set of compute resources. In this example, region B will be the target region for which traffic will be switched to. That is, the failover will occur for traffic from the first region to the second region. The method 700 may further include receiving a selection of specified subset of compute resources in region A and targeting subset of compute resources to participate in the failover based on resource attributes. For example, a certain compute resource type may be undergoing testing in the region A. Therefore, only the compute resources undergoing testing will need failing over. In some embodiments, all compute resources within region B are targeted to participate in the failover.

In operation 720, method 700 includes identifying, based on runtime metadata, a minimum value of the second set of compute resources and a maximum value of the second set of compute resources in region B. The method 700 may further include obtaining the maximum value and the minimum value corresponding to the second set of compute resources from scaling configurations of the compute resources. The minimum value and the maximum value correspond to, for example, a minimum and maximum count of workload units that may be handled by the compute resources.

In operation 730, method 700 includes storing the minimum value as temporary runtime metadata in the second set of compute resources. In some implementations, the minimum value is stored as a label in the second set of clusters.

In operation 740, method 700 includes maximizing the second set of compute resources by increasing the minimum value to the value. In some embodiments, the method further includes calculating a new minimum based on a combined current traffic in region A and region B and maximizing the first set of compute resources in region B to the new minimum. As such, the compute resources in region B will be updated to handle an influx of traffic specifically calculated to align with current traffic in region B, plus the additional traffic switching over from region A.

In operation 750, method 700 includes switching traffic from the first set of compute resources in region A to the second set of compute resources in region B. In some embodiments, the method further includes setting backend traffic of the first set of compute resources in region A to zero percent. The method may further include waiting a preset period of time to provide sufficient time for load balancing. A load balancer may be updated based on the load switching/settings in method 700.

In some embodiments, the method further includes polling the second set of compute resources to validate whether each compute resource in the second set of compute resources is maximized (from the minimum value to the maximum value). The method 700 may further include determining that a maximization failure has occurred based on at least one compute resource in the second set of clusters not meeting the maximum value within a second period of time. Based on a determination that the maximization failure has occurred, the method 700 may include stopping the failover (e.g., the maximization and/or the switching of traffic). The method 700 may further include alerting an operator of the platform server in response to the maximization failure.

In operation 760, method 700 includes un-maximizing the second set of compute resources by setting the minimum value to the original value based on the stored temporary runtime metadata. The method may further include waiting a predetermined time period between the maximizing (in operation 740) and the un-maximizing in operation 760. The method may even further include waiting a predetermined time period between the switching (in operation 750) and the un-maximizing in operation 760 to ensure stability of the system/compute environment. After un-maximizing the second set of compute resources, in operation 770, method 700 may further include clearing the temporary runtime metadata (or the label) stored in the second set of compute resources.

In operation 770, method 700 includes clearing the temporary runtime metadata (or the label) in the second set of computing resources and ending the failover operation.

Although FIG. 5 shows example blocks of the method 700, in some implementations, the method 700 may include additional blocks, fewer blocks, different blocks, or differently arranged blocks than those depicted in FIG. 5 based on one or more embodiments disclosed herein. Additionally, or alternatively, two or more of the blocks of the method may be performed in parallel.

Methods and systems according to embodiments described herein provide advantages that improve compute resource stability and performance in a system performing failover including, but not limited to, an increase in deployment frequency (i.e., how often a deployment successfully releases to production) and a reduction in lead time for changes (i.e., amount of time it takes a commit to get into production), change failure rate (i.e., the percentage of regional failovers and failbacks of deployments causing a failure in production or a disruption in services rendered to customers), time needed to restore a service (i.e., how long it takes a platform to recover from a failure in production), and time needed to perform a regional failover/failback that handles compute resource maximization and un-maximization. As an example of embodiments reducing lead time for changes, if a change requires regional failover to make absolutely certain that there is no customer impact, the time that it takes to get that change deployed to production is reduced.

Hardware Overview

FIG. 6 is a block diagram illustrating an exemplary computer system 800 with which the client and server of FIG. 1, and method(s) described herein can be implemented. In certain aspects, the computer system 800 may be implemented using hardware or a combination of software and hardware, either in a dedicated server, or integrated into another entity, or distributed across multiple entities. Computer system 800 may include a desktop computer, a laptop computer, a tablet, a phablet, a smartphone, a feature phone, a server computer, or otherwise. A server computer may be located remotely in a data center or be stored locally.

Computer system 800 (e.g., client 110 and server 130) includes a bus 808 or other communication mechanism for communicating information, and a processor 802 (e.g., processors 112) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 120), such as a Random Access Memory (RAM), a Flash Memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 113) include networking interface cards, such as Ethernet cards and modems. In certain aspects, input/output module 810 is configured to connect to a plurality of devices, such as an input device 814 (e.g., input device 114) and/or an output device 816 (e.g., output device 116). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client device 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, performed by at least one processor, the method comprising:

isolating a first region and a second region in a compute environment, the first region comprising a first set of compute resources and the second region comprising a second set of compute resources;

identifying, based on runtime metadata, a minimum value, representing a minimum capacity, of the second set of compute resources and a maximum value, representing a maximum capacity, of the second set of compute resources in the second region, where the second set of compute resources currently accept traffic at any value between the minimum and maximum value;

storing the minimum value as temporary runtime metadata in the second set of compute resources;

maximizing the second set of compute resources by updating the minimum value to the maximum value;

switching traffic, in response to a failover event of the first set of compute resources, from the first set of compute resources in the first region to the second set of compute resources in the second region;

un-maximizing, after waiting a first time period, the second set of compute resources by setting the minimum value to its original value based on the temporary runtime metadata; and clearing the temporary runtime metadata from the second set of compute resources.

2. The computer-implemented method of claim 1, further comprising:

setting backend traffic corresponding to the first set of compute resources in the first region to zero.

3. The computer-implemented method of claim 1, further comprising:

obtaining the maximum value and the minimum value from scaling configurations corresponding to the second set of compute resources.

4. The computer-implemented method of claim 1, wherein the second region includes a plurality of regions in which a database operates.

5. The computer-implemented method of claim 1, further comprising:

receiving a selection of specified compute resources in the first region; and targeting the specified compute resources within the first region to be targeted for the switching.

6. The computer-implemented method of claim 1, wherein all compute resources within the first region are targeted to participate in the switching.

7. The computer-implemented method of claim 1, further comprising:

calculating an updated minimum based on a combined current traffic in the first region and the second region; and maximizing the second set of compute resources by updating the minimum value to the updated minimum.

8. The computer-implemented method of claim 1, further comprising:

polling the second set of compute resources to validate whether each compute resource in the second set of compute resources is maximized from the minimum value to the maximum value; and determining a maximization failure has occurred based on at least one compute resource, in the second set of compute resources, failing to meet the maximum value within a second time period, wherein the maximizing is stopped based on the maximization failure.

9. The computer-implemented method of claim 8, further comprising:

displaying an alert, via a user interface, to an operator of a platform server in response to the maximization failure.

10. A system comprising:

one or more processors; and a memory storing instructions which, when executed by the one or more processors, cause the system to:

isolate a first region and a second region in a compute environment, the first region comprising a first set of compute resources and the second region comprising a second set of compute resources;

identify, based on runtime metadata, a minimum value, representing a minimum capacity, of the second set of compute resources and a maximum value, representing a maximum capacity, of the second set of compute resources in the second region, where the second set of compute resources currently accept traffic at any value between the minimum and maximum value;

store the minimum value as temporary runtime metadata in the second set of compute resources;

maximize the second set of compute resources by updating the minimum value to the maximum value;

switch traffic, in response to a failover event of the first set of compute resources, from the first set of compute resources in the first region to the second set of compute resources in the second region;

un-maximize, after waiting a first time period, the second set of compute resources by setting the minimum value to its original value based on the temporary runtime metadata; and clear the temporary runtime metadata from the second set of compute resources.

11. The system of claim 10, wherein the one or more processors further execute instructions to:

set backend traffic corresponding to the first set of compute resources in the first region to zero.

12. The system of claim 10, wherein the one or more processors further execute instructions to:

obtain the maximum value and the minimum value from scaling configurations corresponding to the second set of compute resources.

13. The system of claim 10, wherein the second region includes a plurality of regions in which a database operates.

14. The system of claim 10, wherein the one or more processors further execute instructions to:

receive a selection of specified compute resources in the first region; and target the specified compute resources within the first region to be targeted for the switching.

15. The system of claim 10, wherein all compute resources within the first region are targeted for the switch.

16. The system of claim 10, wherein the one or more processors further execute instructions to:

calculate an updated minimum based on a combined current traffic in the first region and the second region; and maximize the second set of compute resources by updating the minimum value to the updated minimum.

17. The system of claim 10, wherein the one or more processors further execute instructions to:

poll the second set of compute resources to validate whether each compute resource in the second set of compute resources is maximized from the minimum value to the maximum value;

determine a maximization failure has occurred based on at least one compute resource, in the second set of compute resources, failing to meet the maximum value within a second time period, wherein the maximizing is stopped based on the maximization failure; and output an alert, via a user interface, to an operator of a platform server in response to the maximization failure.

18. A non-transient computer-readable storage medium having instructions embodied thereon, the instructions being executable by one or more processors to perform a method and cause the one or more processors to:

in response to a failover event of one or more compute resources in a first region, identify one or more compute resources in a target region;

identify whether a maximize or an un-maximize action is specified for the one or more compute resources in the target region;

based on the maximize action being specified, switching traffic from the first region to the target region, the switching configured to:

obtain a minimum value, representing a minimum capacity, and a maximum value, representing a maximum capacity, from autoscaling configurations, where the one or more compute resources in the target region currently accept traffic at any value between the minimum and maximum value;

save the minimum value as a label in the one or more compute resources; and set the minimum value to match the maximum value; and based on the un-maximize action being specified, performing un-maximizing of the one or more compute resources in the target region, the un-maximizing configured to:

retrieve the minimum value from the label stored in the one or more compute resources in the target region;

set the minimum value to an original minimum based
  on the retrieved label; and clear the label.

19. The non-transient computer-readable storage medium
of claim 18, wherein the instructions further cause the one
or more processors to:

wait a predetermined amount of time before performing
  the un-maximizing.

20. The non-transient computer-readable storage medium
of claim 18, wherein the instructions further cause the one
or more processors to:

poll the one or more compute resources in the target
  region to validate whether each compute resource in the
  one or more compute resources in the target region is
  maximized from the minimum value to the maximum
  value; and determine a maximization failure has occurred based on at
  least one compute resource of the one or more compute
  resources in the target region failing to meet the maxi-
  mum value within a predetermined amount of time,
  wherein maximizing is stopped based on the maximi-
  zation failure.

<div align="center">* * * * *</div>